(12) United States Patent
Bieselin et al.

(10) Patent No.: US 7,881,232 B2
(45) Date of Patent: Feb. 1, 2011

(54) TECHNIQUES FOR MANAGING EXPENSES FOR A CONFERENCE SCHEDULED USING AVAILABILITY DATA

(75) Inventors: David Bieselin, Menlo Park, CA (US); Randall Ethier, Burke, VA (US)

(73) Assignee: Cisco Technology, Inc., San Jose, CA (US)

(*) Notice: Subject to any disclaimer, the term of this patent is extended or adjusted under 35 U.S.C. 154(b) by 1836 days.

(21) Appl. No.: 10/983,283

(22) Filed: Nov. 5, 2004

(65) Prior Publication Data

US 2006/0045253 A1    Mar. 2, 2006

Related U.S. Application Data

(63) Continuation-in-part of application No. 10/931,737, filed on Sep. 1, 2004.

(51) Int. Cl.
*H04L 12/16* (2006.01)

(52) U.S. Cl. .................. 370/260; 708/112; 379/202.01; 379/265.09; 705/8

(58) Field of Classification Search ............ 705/8, 705/14, 12, 9, 10; 708/112; 370/260; 379/202.01, 379/265.09
See application file for complete search history.

(56) References Cited

U.S. PATENT DOCUMENTS

| | | | |
|---|---|---|---|
| 4,626,836 A | 12/1986 | Curtis et al. | |
| 4,807,154 A | 2/1989 | Scully et al. | |
| 4,807,155 A | 2/1989 | Cree et al. | |
| 4,817,018 A | 3/1989 | Cree et al. | |
| 4,819,191 A | 4/1989 | Scully et al. | |
| 4,977,520 A | 12/1990 | McGaughey, III et al. | |
| 5,050,077 A | 9/1991 | Vincent | |
| 5,197,000 A | 3/1993 | Vincent | |
| 5,261,045 A | 11/1993 | Scully et al. | |
| 5,774,867 A | 6/1998 | Fitzpatrick et al. | |
| 5,933,810 A | 8/1999 | Okawa | |
| 5,987,463 A | 11/1999 | Draaijer et al. | |
| 6,047,260 A | 4/2000 | Levinson | |
| 6,167,379 A | 12/2000 | Dean et al. | |
| 6,275,575 B1 | 8/2001 | Wu | |
| 6,363,352 B1 | 3/2002 | Dailey et al. | |
| 6,396,510 B1 | 5/2002 | Pendse et al. | |
| 6,781,920 B2 | 8/2004 | Bates et al. | |

(Continued)

OTHER PUBLICATIONS

U.S. Non-final Office Action dated Mar. 25, 2009 for U.S. Appl. No. 10/931,737.

(Continued)

*Primary Examiner*—Fan Tsang
*Assistant Examiner*—Simon King
(74) *Attorney, Agent, or Firm*—Brinks Hofer Gilson & Lione

(57) ABSTRACT

Techniques for scheduling a conference among multiple persons include receiving quorum data, availability data and cost data. Quorum data indicates a quorum for a particular conference. Availability data indicates availability of a plurality of persons who satisfy the quorum. Cost data indicates a cost to be incurred while conducting a conference. A proposed cost for the particular conference that satisfies the quorum is determined based on the quorum data, the availability data and the cost data. These techniques allow costs of products and services that support a scheduled conference to be estimated, and allow those products and services to be reserved and paid for without additional manual input.

20 Claims, 3 Drawing Sheets

U.S. PATENT DOCUMENTS

| | | | |
|---|---|---|---|
| 7,027,996 | B2 | 4/2006 | Levinson |
| 7,283,970 | B2 | 10/2007 | Cragun |
| 7,299,193 | B2 | 11/2007 | Cragun et al. |
| 7,343,312 | B2* | 3/2008 | Capek et al. ............ 705/8 |
| 2002/0065689 | A1* | 5/2002 | Bingham et al. ............ 705/5 |
| 2002/0069406 | A1* | 6/2002 | Aaltonen et al. ............ 725/34 |
| 2002/0163572 | A1 | 11/2002 | Center, Jr. et al. |
| 2003/0149605 | A1* | 8/2003 | Cragun et al. ............ 705/8 |
| 2003/0174826 | A1 | 9/2003 | Hesse |
| 2003/0233265 | A1 | 12/2003 | Lee et al. |
| 2004/0064355 | A1 | 4/2004 | Dorenbosch et al. |
| 2004/0078256 | A1 | 4/2004 | Glitho et al. |
| 2004/0128502 | A1* | 7/2004 | Royer ............ 713/156 |
| 2005/0027581 | A1 | 2/2005 | Kjesbu et al. |
| 2005/0071213 | A1 | 3/2005 | Kumhyr et al. |
| 2006/0010023 | A1* | 1/2006 | Tromczynski et al. ............ 705/8 |
| 2008/0228547 | A1 | 9/2008 | Doss et al. |

OTHER PUBLICATIONS

U.S. Non-Final Office Action dated May 12, 2009 for U.S. Appl. No. 10/984,402.

Non-Final Office Action dated Oct. 7, 2009 cited in U.S. Appl. No. 10/958,523 (BHGL Ref. No. 13522-00227).

Non-Final Office Action dated Oct. 13, 2009 cited in U.S. Appl. No. 10/931,737 (BHGL Ref. No. 13522-00228).

Beard, David; Palaniappan, Murugappan; Humm, Alan; Banks, David; Nair, Anil; Shan, Yen-Ping. "A visual Calendar for Scheduling Group Meetings". Oct. 1990. CSCW 1990 Proceedings, pp. 279-290.

Hayes, Thomas; Sen, Sandip; Arora, Neerag; Nadella, Rajani. "An Automated Meeting Scheduling System that Utilizes User Preferences." 1997. International Conference on Autonomous Agents. Proceedings of the First International Conference on Autonomous Agents, pp. 308-315.

Gu, P.; Balasubramanian, S.; Norrie, D.H., "Bidding-Based Process Planning and Scheduling in a Multi-Agent System," Computers Ind. Engng, 32(2):477-496 (1997).

Garrido, Leonardo; Sycara, Katia "Multi-Agent Meeting Scheduling: Preliminary Experimental Results," *AAAI Proceedings of the Second International Conference on Multiagent Systems*, (1996).

Sen. Sandip; Durfee, Edmund H., "On the Design of an Adaptive Meeting Scheduler" *IEEE In Proc. Of the Tenth Conference on AI Applications* (1994).

Chang-Shing Lee, Chen-Yu Pan, An Intelligent Fuzzy Agent for Meeting Scheduling Decision Support System, *Fuzzy Sets and Systems*, 142(3):467-488 (2004).

Non-Final Office Action dated Mar. 30, 2010 cited in U.S. Appl. No. 10/984,402 (BHGL Ref. No. 13522-226).

Non-Final Office Action dated Mar. 30, 2010 cited in U.S. Appl. No. 10/958,523 (BHGL Ref. No. 13522-227).

Non-Final Office Action dated Mar. 30, 2010 cited in U.S. Appl. No. 10/931,737 (BHGL Ref. No. 13522-228).

Notice of Allowance dated Sep. 27, 2010 in U.S. Appl. No. 10/931,737 filed Sep. 1, 2004.

Notice of Allowance dated Sep. 29, 2010 in U.S. Appl. No. 10/984,402 filed Nov. 9, 2004.

* cited by examiner

TECHNIQUES FOR MANAGING EXPENSES FOR A CONFERENCE SCHEDULED USING AVAILABILITY DATA

CROSS-REFERENCE TO RELATED APPLICATIONS

This application claims benefit as a Continuation in-part of U.S. patent application Ser. No. 10/931,737, by Randall Ethier and David Bieselin, filed Sep. 1, 2004 (hereinafter Ethier), the entire contents of which are hereby incorporated by reference as if fully set forth herein, under 35 U.S.C. §120.

BACKGROUND OF THE INVENTION

1. Field of the Invention

The present invention relates to using availability data shared among users to schedule conferences (including meetings) among users, and in particular to manage expenses for such conferences.

2. Description of the Related Art

A number of software applications are available for scheduling conferences among busy members of an enterprise or other organization For example, a commercial meeting scheduling application is available from Meeting Maker Inc. of Waltham, Mass.; and from Latitude of Santa Clara, Calif. (a subsidiary of Cisco Systems Inc. of San Jose, Calif.). These applications have in common a database that stores information related to a calendar of conferences and appointments each member is scheduled to attend. Such a database is herein called a shared electronic calendar. For purposes of the following discussion, the term conference includes any simultaneous coming together of multiple parties for communication, whether involving a meeting held in person or involving remote communications, including data, audio, video, or multi media communications, or some combination of in-person meetings and remote communications.

For example, some systems allow a conference organizer user (the "organizer") to specify a list of mandatory attendees and a list of optional attendees from the organization. The scheduling application ("scheduler") then determines one or more proposed times that all the mandatory attendees can attend a meeting based on data in the organization's shared electronic calendar. The proposed times are presented one at a time in chronological order. The scheduler also lists the optional attendees who are also available to attend each proposed time. The organizer then sends a message to the selected attendees for one of the proposed times, inviting them to attend the meeting.

While greatly simplifying the task of finding times when a limited number of persons are available for a conference, the existing systems still suffer some deficiencies.

For example, under some circumstances, such as when the list of mandatory attendees is large, the first proposed time may be too distant to be useful for the purposes of the conference. For example, the purpose of the meeting may be to determine what research results to present at an upcoming scientific convention. When the first proposed time is too close to, or after, the start of the convention, the first proposed time is not useful for accomplishing the purpose of the meeting. The existing systems do not give an organizer sufficient automatic choices to resolve such a scheduling conflict.

One approach would be for an organizer to identify one or more representative groups of persons. Any member of a representative group satisfies the needs of the conference, without requiring all or a particular member of the group to attend. With extant scheduling systems, an organizer can not define a representative group. Instead an organizer must determine a set of combinations of attendees, each combination having one attendee from each representative group. The organizer then has to enter all combinations manually and obtain one or more proposed dates for each combination. Then the organizer would have to review the large number of possible dates and select a best one, e.g., the earliest. This is a tedious, time consuming, and error-prone process. In most instances, the organizer would try a few of the combinations and then either give up or settle for a date that is not optimal.

For some conferences, cost matters. For example, the organizer may be required to conduct the conference within a specified cost budget, or to minimize costs. Even if the organizer perseveres through all manual combinations of one or more representative groups, or foregoes representative groups altogether, there still may be insufficient information from the calendar system to select the best one, e.g., the least costly or the earliest date with costs that fall within the cost budget.

Furthermore, even if a conference is scheduled that falls with a budget, there is additional tedious work imposed on the organizer. To verify that the conference falls within a cost budget, the organizer must manually establish the cost of the conference. For example, the organizer must obtain the costs for reserving a conference room (or multiple conference rooms if a multipoint remote conference is being held) and any equipment needed in those rooms. If refreshments or more substantial food are to be provided for one or more of the conference rooms, the organizer needs to determine the costs of such food. If one or more conference attendees are to travel to the location of one of the conference rooms, the costs of that travel must also be estimated. If the travel involves one or more overnight stays, then the costs of lodging and meals away from the conference must also be estimated. To do this, the conference organizer might log onto a billing system for the organizer's enterprise; determine the average or typical costs for one or more conference rooms of the appropriate size and with the appropriate equipment; and determine the typical costs for travel and daily lodging, board and travel incidentals. If the billing system lacks some of this information, the organizer may have to log onto one or more other systems that provide cost data, such as a travel agency website to determine the current fares between cities and hotel costs at each city involved in the conference.

After the costs are estimated, the organizer must then reserve the rooms, equipment, plane seats, hotels and other resources for the conference. To do this, the conference organizer often logs onto one or more other systems, such as a conference room reservation system for the organizer's organization or enterprise, an external airline reservation system, an external hotel reservation system, an external telephone conference reservation system, a network service provider reservation system, and an external catering reservations system.

During or after such reservation efforts, the organizer must obtain authorization for the organizer's organization to pay for the resources. For example, the organizer logs onto an enterprise billing system to fill out a purchase order request. The purchase order request typically requires the organizer to input data indicating a vendor, a resource to be procured, a delivery date, a cost, and an enterprise account to bear the costs. The organizer enters this data manually into the billing system.

In spite of the automation of the separate calendar, reservation and billing systems, the organizer is faced with a highly manual process. The information obtained from one system is manually input into one or more other systems. The same information might be input manually by the organizer multiple times, perhaps in different formats each time. The process is very tedious and subject to loss of concentration by the conference organizer and thus prone to data entry error. The process also consumes a substantial amount of the organizer's time and effort, leaving less time for other duties of the organizer. In some cases, the organizer's productivity suffers. In some cases, the organizer foregoes the conference and attempts to deal with the conference issues in another way, causing the organization to suffer with less effective means for dealing with issues.

Clearly, there is a need for a conference scheduling system that does not suffer the deficiencies of current conference scheduling systems. In particular, there is a need for a conference scheduling system that automatically manages expenses for a conference scheduled using data on the availability of persons or conference resources or both.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for managing costs of conferences scheduled based on availability data. These techniques include obtaining cost data from one or more cost databases in addition to availability data obtained from an availability system such as an electronic calendar.

In a first set of embodiments, a method for scheduling a conference among multiple persons includes receiving quorum data that indicates a quorum for a particular conference. Availability data that indicates availability of persons who satisfy the quorum is received from a database. Cost data that indicates a cost to be incurred while conducting a conference is also received from the same or a different database. A proposed cost for the particular conference that satisfies the quorum is determined based on the quorum data, the availability data and the cost data.

In some embodiments of the first set, the method also includes determining a time for the particular conference or one or more locations for the particular conference, or some combination of time and location, based at least in part on the availability data.

In some of these embodiments, the method includes determining a vendor to provide a service or a product, or both, based on the cost data. In some of these embodiments, the method includes reserving the product or service from the vendor based on the cost data. In some of these embodiments, the method includes authorizing payment to the vendor based on the cost data.

In some embodiments of the first set, the cost data includes, but is not limited to, data that indicates a cost for transportation, food, lodging, conference room, equipment, conferencing service for the remote participants, pre-conference preparation for the conference room, post-conference housecleaning for the conference room, and network resources among multiple locations, or some combination of these costs.

In other sets of embodiments, computer readable media and systems perform the steps of the above methods.

In various embodiments, these techniques allow costs of products and services that support a scheduled conference to be estimated, and allow those products and services to be reserved and paid for without additional manual input.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
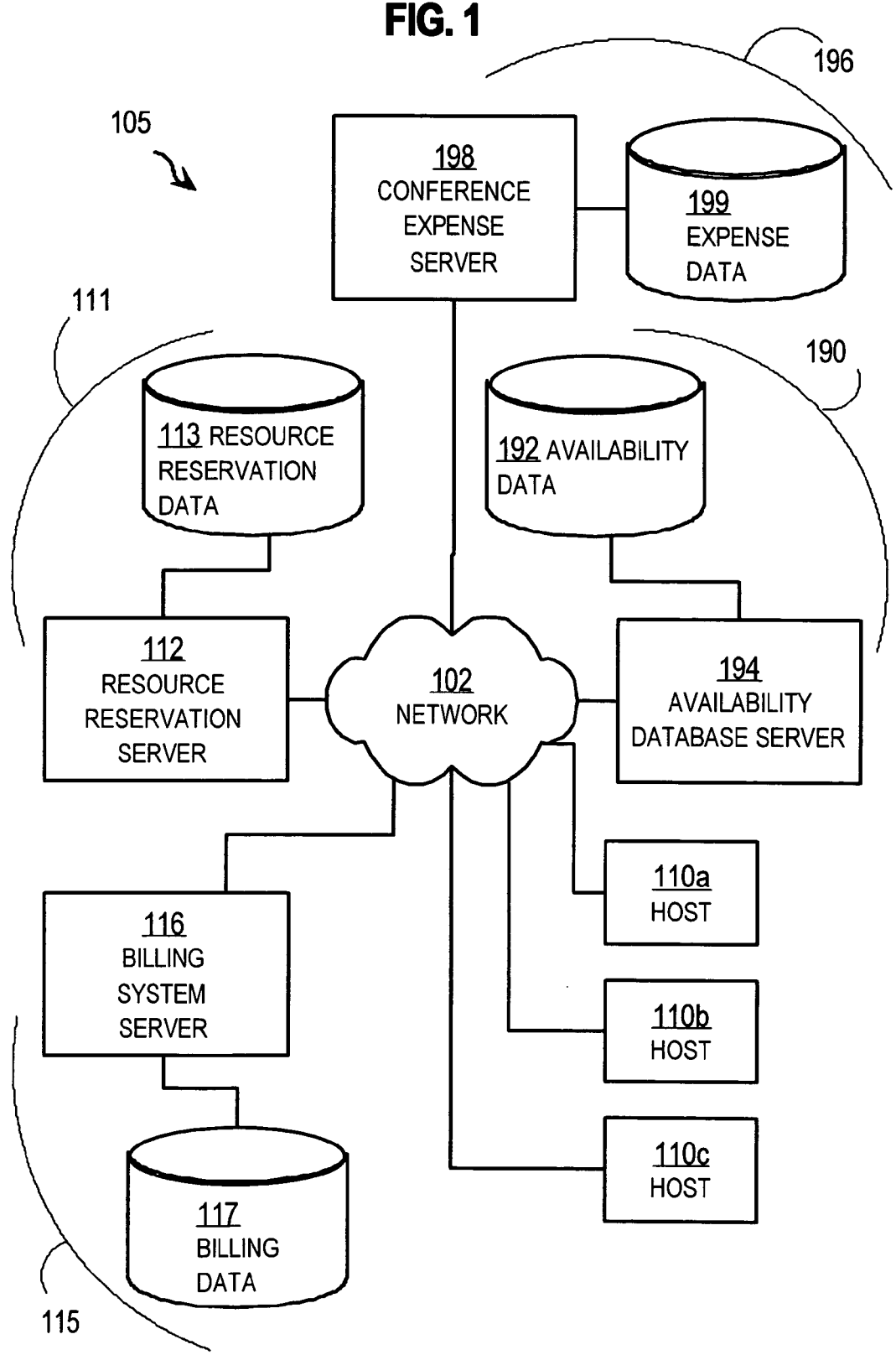
FIG. 1 is a block diagram that illustrates a system with data and servers for scheduling a conference, according to an embodiment.

A method and apparatus are described for scheduling a conference. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For example, embodiments of the invention are described in the context of using data from an electronic calendar, using a conference room reservation system, using a teleconference reservation system and using a purchase order request system; but the invention is not limited to this context. In other contexts, other data may be used instead of or in addition to data from an electronic calendar, such as flat files of scheduled conferences and attendees, electronic personnel travel requisitions, data indicating the presence of a user on a network (called herein "presence data") including a wireless network, a large area network, the Internet or a cellular telephone network, and data indicating resources scheduled for a conference, such as network equipment, conference room, and conference room equipment. In other contexts, other systems may be used instead of or in addition to a conference room and teleconference service reservation system, such as an airline reservation system, a hotel reservation system, and a network configuration system. In some embodiments a reservation system or teleconference service, or both, may be omitted. In other contexts, other systems may be used instead of or in addition to a purchase order request system, such as an enterprise billing system, a spend management system, a vendor invoice system, a credit card payment system, a bank account payment system, or a payment system may be omitted.

Presence data is used as availability data in several extant and emerging applications. For example, in instant messaging applications, such as AOL Instant Messenger (AIM) from America Online of Dulles, Va. and PresenceWorks of PresenceWorks, Inc in Alexandria Va., presence data indicates the instantaneous knowledge that someone is available online and reachable via instant messaging. More broadly, presence data indicates a dynamically changing set of channels, capabilities, characteristics, preferences and ability for persons to communicate and interact with each other. It includes such states of availability as "online," "offline," "do not disturb," "at lunch." Some applications consider other availability information as presence data, including information that indicates, for a particular person, "try mobile phone first, then business line", "always send e-mail" or "unavailable for conference calls, but available for webcasts." In some applications, presence data may include physical location of the person such as "on travel in London," or "at home," or "in office" or "at company headquarters," as well as a network address. In some applications, presence data indicates people on the same (virtual) location like a web page or a shared document. In some applications, presence data indicates people who are within the same cell (the geographical area covered by a cellular phone antenna). In some applications, presence data indicates location of a person or facility based on a positioning system, such as the Global Positioning System (GPS) widely used in commerce and by the military. As used in the following, presence data indicates the actual location or communicative state of a person at the current time and includes all sources of such information, no matter how precise or reliable, including a person's planned location in a calendar database for the current time.

1. Structural Overview

FIG. 1 is a block diagram that illustrates a system 105 with data and servers for scheduling a conference, according to an embodiment. The system 105 includes a network 102, hosts 110a, 110b, 110c (collectively referenced hereinafter as hosts 110), an availability data system 190, a reservation system 111, a billing system 115, and a conference expense system 196.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

The network 102 is any network that connects a variety of users of host computers, including, but not limited to, local area networks (LANs), wireless networks, wide-area networks (WAN), the Internet (a network of heterogeneous networks using the Internet Protocol, IP), and virtual private networks. In an embodiment using a single stand alone system, network 102 may be omitted.

The hosts 110 are computers to which a population of potential participants in conferences (the "conference population"), or their human agents such as secretaries and assistants, have access. The hosts are connected to network 102. For the purposes of illustration, three hosts 110a, 110b, 110c are shown in FIG. 1. In other embodiments more or fewer hosts are connected to network 102. In an embodiment using a single stand alone system, only one host, e.g., host 110a, is used.

The system 105 includes an availability database system 190, which includes an availability database server 194 and availability data 192 on one or more storage devices. The availability database server controls the storage and retrieval of availability data 192. Availability data is any data that indicates the availability of persons or resources to be included in a conference and may include electronic calendar data. For purposes of illustration, availability database server 194 is shown separate from hosts 110; but in some embodiments, availability database server 194 resides in part or in whole on one or more of hosts 110. Furthermore, for purposes of illustration, one availability server 194 is connected to one storage device with calendar data 192, but in other embodiments, the availability data may be distributed over several data storage devices connected directly to one or more availability database servers like server 194, or connected indirectly to one or more servers through network 102. In various embodiments, system 105 includes more or fewer availability database systems like system 190.

Any availability database system known in the art may be used as availability database system 190. For example, in some embodiments an electronic calendar, such as Latitude or Meeting Maker, is used. Calendar data typically includes one or more data structures that hold data indicating a person from the population and zero or more commitments of time for that person, including data indicating a start date and time and stop date and time for the commitment.

In some embodiments, an availability database system that uses more extensive availability data is used as availability database system 190. For example, in some embodiments a conference scheduling server is used as described in Ethier, cited above, that includes presence data and conference resource availability.

In some embodiments, availability database system 190 includes priority data that indicates the priority of commitments made for conference resources or persons in the population, as described in U.S. patent application Ser. No. 10/958,523, by David Bieselin and Randall Ethier, filed Oct. 5, 2004 (hereinafter Bieselin I), the entire contents of which are hereby incorporated by reference as if fully set forth herein. In some embodiments, availability database system 190 includes location data that indicates the location of conference resources, or the planned or current location of persons in the population, or some combination as described in U.S. patent application Ser. No. 10/984,402, by David Bieselin and Randall Ethier, (hereinafter Bieselin II), the entire contents of which are hereby incorporated by reference as if fully set forth herein. In some embodiments, availability database system 190 includes systems that generate or utilize presence data that indicates the physical or network location of a person at a current time and systems that use location data that indicates the current or expected location of a person, such as a travel request processing system or a human resources employee leave processing system.

The system 105 includes a resource reservation system 111 and a billing system 115, which are two examples of a cost data system. A cost data system manages the generation, storage, retrieval, or some combination, of information about the cost of resources used to support a conference.

Resource reservation system 111 includes a resource reservation server 112 and resource reservation data 113 on one or more storage devices. The resource reservation server 112 controls the storage and retrieval of resource reservation data 113. For purposes of illustration, server 112 is shown separate from hosts 110; but in some embodiments, server 112 resides in part or in whole on one or more of hosts 110. Furthermore, for purposes of illustration, one server 112 is connected to one storage device with data 113, but in other embodiments, the data 113 may be distributed over several data storage devices connected directly to one or more servers like server 112, or connected indirectly to one or more servers through network 102.

Billing system 115 includes a billing server 116 and billing data 117 on one or more storage devices. The billing server 116 controls the storage and retrieval of billing data 117. For purposes of illustration, server 116 is shown separate from hosts 110; but in some embodiments, server 116 resides in part or in whole on one or more of hosts 110. Furthermore, for purposes of illustration, one server 116 is connected to one storage device with data 117, but in other embodiments, the data 117 may be distributed over several data storage devices connected directly to one or more servers like server 116, or connected indirectly to one or more servers through network 102.

In various embodiments, system 105 includes more or fewer cost data systems like systems 111, 115. In some embodiments, one or more servers like servers 112, 116 are embedded in availability database server 194. In some embodiments, one or more systems like systems 111, 115 are embedded in availability database system 190. For example, in some embodiments, a conference room reservation system is embedded in a conference scheduling system as described in Ethier.

The system 105 includes a conference expense system 196. The conference expense system 196 includes conference expense server 198 and conference expense data 199 on a storage device. The conference expense server 198 determines the expense elements for a conference based on data from the cost systems, such as reservation system 111 or billing system 115 or both as described in more detail below with reference to FIG. 2. The conference expense server 198 manages the storage and retrieval of expense data 199 on one or more storage devices. In some embodiments, separate storage of expense data 199 is temporary or omitted and server 198 relies only on data received from cost systems.

For purposes of illustration, conference expense server 198 is shown separate from hosts 110 and servers 194, 112, 116; but in some embodiments, conference expense server 198 resides in part or in whole on one or more of hosts 110 or on a host with other depicted systems 190, 111, 115 or as part of servers 194, 112, 116. In some embodiments, the conference expense server 198 may be distributed over several hosts connected to network 102. For purposes of illustration, one server 198 is connected to one storage device with data 199, but in other embodiments, the data 199 may be distributed over several data storage devices connected directly to one or more servers like server 198, or connected indirectly to one or more servers through network 102. In some embodiments, expense data 199 is not stored separately from other cost data, such as reservation data 113 and billing data 117.

2. Functional Overview

Cost information is obtained and used to mange expenses for a conference scheduled using availability data. Based on the cost information and the availability data, a cost associated with a particular conference is determined, such as the total cost or the travel cost, or some combination of costs.

In various embodiments, the conference organizer may specify properties of the conference, such as its duration and a description of the topic, which a scheduling system uses in determining the conference time and the expense server 198 uses to determine at least some elements of the conference cost The system 105 may report not only on the cost, but also may give a time, a list of invitees, their locations at the time of the conference, their notification addresses, and other data relevant to scheduling the meeting. The system 105 may automatically send invitations to the meeting to the invitees. In some embodiments, the system 105 may include one or more preset limits on how much any one meeting may cost for any one conference organizer. In some embodiments a system manager for system 105 may set the limits.

Of many possible meeting times for the conference, the system 105 selects one along with zero or more alternatives. For example, the system 105 may select the time when a quorum can be met which is associated with the lowest cost, and determine as alternatives the next two lowest costs when a quorum can be met, to be presented when the organizer or an invitee rejects the selected time. Instead of using the lowest cost, the system 105 may select among several potential conferences within a budget limit based on another property, such as the earliest time or the fewest languages needed to communicate at the meeting.

In addition, in some embodiments, the cost information is used to automatically reserve, or authorize payment, or both, for resources to support the conference, such as conference rooms, equipment, preparation services, housecleaning, food, travel, lodging, and network configuration services.

3. Method for Scheduling a Conference

Figure 2:
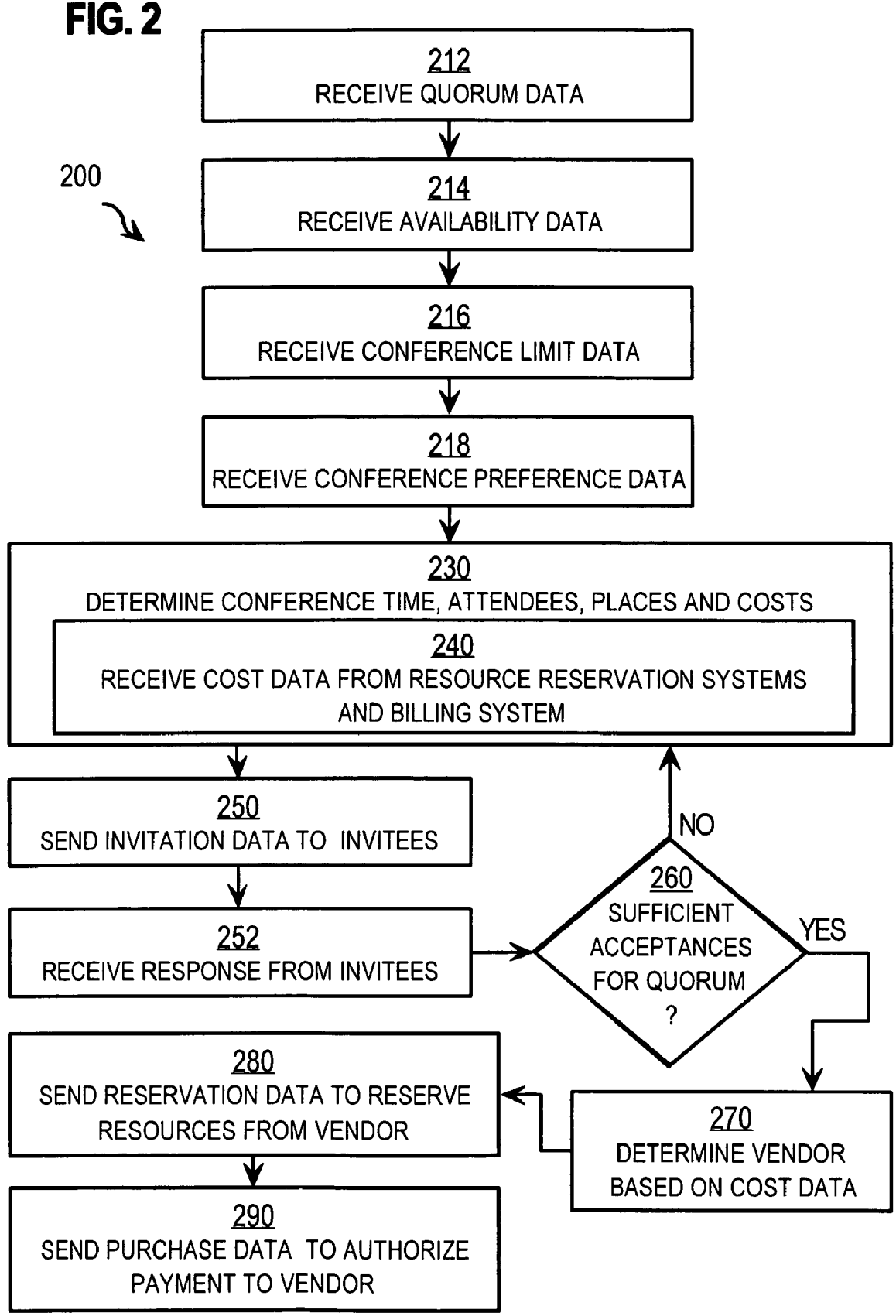
FIG. 2 is a flow diagram that illustrates a method for scheduling a conference, according to an embodiment.

To illustrate a method, an example embodiment is described. FIG. 2 is a flow diagram that illustrates a method 200 for scheduling a conference, according to an embodiment. Although steps are indicated in a particular order in FIG. 2, in other embodiments, the steps may be performed in a different order or overlapping in time. For example, steps 210 through 218 may be performed in any order or may overlap in time. In addition, in some embodiments one or more steps are omitted.

In step 212 the scheduling process receives quorum data. Any method may be used to receive the quorum data including, but not limited to, predefined data stored within source code or in files stored with the executable code ("default values") or in files or a database accessible to the process, organizer input either in response to prompts from the process or independently of prompts, or from data included in a message sent to the conference availability database server 194 by another server or from a client process, such as a client process on a host 110 operated by an organizer.

The quorum data indicates one or more groups and the minimum number of persons from each group. It is assumed for purposes of illustration that there are six groups (A, B, C, D, E, F), each with four persons. In some embodiments, the same person appears in more than one group. For example, an electrical engineer who is also department head may appear in a group for a particular technical expertise and in another group for organizational approval authority. It is further assumed for purposes of illustration that the quorum data indicates a minimum of zero members from group A, a minimum of one member from each of groups B, C, and D, a minimum of two members from group E, and a minimum of four members from group F. A group for which a minimum of zero members make a quorum, like group A, is called an optional group; all its members are optional attendees. One optional group with optional attendees is used in some commercial systems. A group with a minimum of one or more members but less than all the members of the group is called a representative group. Groups B, C, D and E are representative groups. At least one member attends to represent each of these groups, but the entire group need not attend, and no particular member of the group is required to attend. Such representative groups are not used in current commercial systems, but are described in Ethier. A group for which a minimum of all members make a quorum, like group F, is called a mandatory group. One mandatory group of attendees is used in some commercial systems.

In step 214, the process receives availability data for persons who make up a quorum. In some embodiments, step 214 includes receiving availability data for a conference room or other resource to support a conference. Any method may be used to receive the availability data, such as listed above for receiving quorum data. In some embodiments the availability of all persons in a population of conference goers is received. In some embodiments, availability is received only for persons in one or more combinations deduced from one or more representative groups.

In some embodiments, during step 214 a calendar database server accesses calendar data. In some embodiments, an availability database server 194 sends a query message to a separate calendar database server to retrieve calendar data and receives availability data in a return message. In some embodiments, the query message includes data identifying one or more persons in the specified groups. In some embodiments, step 214 is performed during step 230, described below, and the query message includes data identifying one or more persons in a combination that satisfies a quorum.

In step 216, the process receives conference limit data. Any method may be used to receive the conference limit data, such as listed above for receiving quorum data. The conference limit data is used to further constrain the properties of conference beyond that set by the quorum and availability of persons from the population. The limit data may be based on any property of the conference including, but not limited to, the duration of the conference, the date of the conference, a time of day, a location, common language, travel cost or total conference cost, or some combination.

For example, in an illustrated embodiment, the organizer wishes to hold a half day multimedia conference with audio and video and data communications within two months for no greater cost than $10,000. Therefore the process receives conference limit data specifying a duration limit of no less than four hours, a date limit of before two months from present, and a location limit to those enterprise facilities that support audio/video/data communications, and a cost limit of $10,000.

In step 218, the process receives conference preference data. Any method may be used to receive the conference preference data, such as listed above for receiving group data. The conference preference data is used to guide the determination of a conference time when there are more than one proposed times that satisfy all constraints. Constraints include the quorum, the availability of persons in the population and other limits set, if any, as described in more detail above for step 216.

For example, in an illustrated embodiment a default value for the conference preference data is to select the earliest time for which all constraints can be met. In the illustrated embodiment, the organizer is then prompted to indicate a different preference for the conference, e.g., based on other conditions of dates, location, language, local time of day or travel costs, among others, or some combination. It is assumed for purposes of illustration that the preference is for a conference for which the estimated travel costs are the lowest among possible conferences that satisfy the constraints.

In step 230, the process determines a cost for the conference that satisfies all the constraints, if possible. In some embodiments, one or more additional properties of the conference are determined. In an illustrated embodiment, step 230 includes determining the time, attendees, and one or more locations for the conference as well as the cost. In some embodiments, one or more alternatives that also satisfy the constraints are also determined. Any method known in the art when the system is implemented may be used to determine the time and other properties of the conference, such as described in Ethier and Bieselin II. As described in Ethier, multiple combinations of persons that would minimally satisfy the quorum are determined. For example, in the illustrated embodiment there are four different permutations of single persons from each of groups B, C, D and six permutations of two people from the four people in group E, one permutation of no people from group A and one permutation of all four people from group F that would minimally satisfy the quorum, yielding a total of $1 \times 4 \times 4 \times 4 \times 6 \times 1 = 384$ combinations. The properties of the conferences associated with each combination are compared to the limits set for the conference. If any combination exceeds the limits, that combination is rejected. If all combinations exceed the limits, then a conflict arises. The conflict may be resolved in any manner known in the art when the system is implemented, such as described in Bieselin I.

The properties associated with a combination are based on the properties associated with the persons in the combination. In some embodiments, the properties associated with persons in a combination are obtained from a calendar database and the locations for each combination are obtained from planned location data in a calendar database or from presence data, as described in Bieselin II. Other properties associated with the person, and relevant for the meeting such as the person's location, the person's languages and fluencies, and the person's residence are included in one or more other databases included in the availability data 192, such as human resources databases.

Step 230 includes step 240 to receive cost data. Cost data indicates the costs of one or more resources incurred to support a conference. Cost data is obtained from one or more cost database systems, such as resource reservation system 111 and billing system 115 in the illustrated embodiment. It is assumed for purposes of illustration that resource reservation data 113 includes information about costs and scheduling facilities for holding audio, video or data teleconferences, and information about conference room facilities. It is further assumed, for purposes of illustration that billing data 117 includes information about estimated travel costs between those facilities and various cities where organization personnel are located.

Any method known in the art at the time the system 105 is implemented may be used to perform step 240. It is assumed for purposes of illustration that conference expense server 198 includes client processes for resource reservation server 112 and billing system server 116. One client process sends messages indicating requests for cost data for facilities at the locations associated with each combination to server 112 and receives the cost data in one or more response messages from the server 112. Similarly, another client process sends messages indicating requests for travel cost estimates between locations of persons and nearest facilities associated with each combination to server 116 and receives the travel cost estimate data in one or more response messages from the server 116.

In some embodiments, the cost data received during step 240 includes information about a vendor for a product or service or both. For example, resource reservation data 113 retrieved by resource reservation server 112 indicates not only an available location and cost for a conference room in a particular city with audio visual teleconferencing equipment, but indicates that this facility is rented as needed from a particular vendor, e.g., XYZ Company for a conference facility in Chicago and AB&C for telecommunications service from that conference facility to a conference room in the organizations own facility, e.g., in San Francisco. In another example, resource reservation data 113 retrieved by resource reservation server 112 indicates not only an available location for a conference room of the organizer's own organization in San Francisco, but indicates that housecleaning for this room is provided by a particular vendor, e.g., MAIDS Company. In some embodiments the server 198 stores this cost data in expense data 199.

In some other embodiments, travel costs are determined not from average costs maintained by billing system 115, but by using reservation systems maintained by particular hotels and airlines. For example, in some embodiments, travel costs are estimated by sampling the Internet fares posted by airlines A1, A2, A3, and by sampling the room rates posted on the Internet by hotels H1, H2, H3, H4. In these embodiments using websites, conference expense server 198 emulates an internet browser in interactions with the websites of these vendors A1, A2, A3, H1, H2, H3, H4. For each combination for which a travel cost is estimated, e.g., for each combination that is available to satisfy a quorum according to calendar data, the server 198 determines the locations of those persons and the locations of the nearest conference rooms and determines travel needs to conduct the conference. It is assumed for purposes of illustration that one combination of persons who satisfy the quorum involves one person traveling from rural Wisconsin to join two other persons at an audio-video facility in Chicago. The server 198 requests fares from airlines A1, A2, A3 to fly that person from the rural town to Chicago, and receives the best fare from airline A3. The server 198 requests room rates in Chicago near the conference room for the night before and the night after the conference from hotels H1, H2, H3, H4 and receives the best rate from hotel H1. The server 198 saves the fare in association with airline A3 and the room rate in association with the hotel H1 in expense data 199. In some embodiments, the server 198 also saves the quotes from the other airlines and hotels in expense data 199.

During step 230, one or more of the combinations that satisfy the constraints are selected according to the conference preference data. For example, in an illustrated embodiment, the combination that involves the lowest estimated travel cost is selected. It is assumed for purposes of illustration that three combinations, designated in temporal order X1, X2, X3, satisfy the quorum of one representative from groups B, C, D, two representatives from group E and all four members of mandatory group F, and satisfy the limits of occurring within two months, using no more than two languages, one of which is English, and involving no more than $10,000 in estimated total cost. It is further assumed that estimated travel costs for the three combinations, based on cost information received by conference expense server 198 are $1700, $2500 and $500, respectively, and that total costs for the three combinations are $8000, $9000, and $8900, respectively. Because the conference preference data indicated the lowest travel cost rather than lowest total cost, combination X2 is selected. In embodiments with a preset spending limit, if the total cost of each of the combinations did not satisfy the preset spending limit (e.g., if the preset spending limit were $7500 instead of $10,000 used in the above example) the conference organizer would not be allowed to book this meeting. In some embodiments with a preset limit, the conference organizer has the ability request a higher spending limit from a manger in a higher echelon of management (e.g., the organizer can request an increase of $1500 in the travel budget from $7500 to $9000).

Control then passes to step 250 to send an invitation message to members of the groups about the selected conference time. In some embodiments, step 250 is omitted and the organizer notifies the members. In some embodiments, the calendars of those members are automatically updated to commit the persons to the conference.

In the illustrated embodiment, step 250 includes sending data about the place and other attendees of the conference and other properties of the conference. Persons who are among the combination that satisfies the constraints are notified that their attendance is mandatory for the particular meeting. In the illustrated embodiment, other persons in one or more groups are also invited to attend. In some embodiments, other properties of the conference are also sent to one or more members of the groups.

Once a person is sent an invitation, in many embodiments that person has the option of rejecting the invitation. In step 252, a response is received from an invitee indicating whether the invitee will accept or reject the invitation. In some embodiments, step 252 is omitted.

In step 260 it is determined whether a mandatory participant for a selected conference time rejects the invitation so that there are not sufficient acceptances for a quorum. If there are not sufficient acceptances, control passes back to step 230 to automatically determine the next alternative that meets all of the criteria for the meeting (the next alternative may include the same mandatory participant but at a different time). In some embodiments, the organizer (i.e., the owner of the meeting) is informed of the rejection and the next alternative so that the organizer can review the change before the previous invitation is withdrawn and the alternative is propagated to the new mandatory and optional attendees. If no alternative remain after a rejection, a conflict arises; and the conflict is resolved, if possible, during step 230, according to any method known in the art at the time the system is implemented.

If the invitees that make up a quorum accept the invitations, control passes to step 270. In step 270, a vendor is determined for procuring a product or service, or both based on the cost data. In some embodiments, step 270 is omitted.

For example, in some embodiments, during step 270, the airline A3 is determined to be the vendor for flying a person of combination X1 from rural Wisconsin to Chicago based on the expense data 199 stored by server 198 from the data received from the Internet website of airline A3 during step 240, described above. Similarly, hotel H1 is determined to be the vendor for lodging that person in Chicago.

In some embodiments, step 270 overlaps in time with step 240. For example, the vendor for a conference room with audio visual teleconferencing equipment in Chicago is determined to be XYZ Company, and the housecleaning service for a teleconference room with such equipment within the organizer's city, say San Francisco, is determined to be MAIDS Company based on data received from resource reservation server 112 during step 240. It is further assumed for purposes of illustration that during step 270 server 198 identifies a sandwich delivery vendor, FOOD company, in the San Francisco based on preferred vendors received in cost data from the billing system during step 240.

In a different embodiment in which travel costs are estimated based on cost data from billing system 115, step 270 includes selecting a vendor based on that estimate. Furthermore, in some embodiments, the billing system 115 provides approved airlines and hotels. In some embodiments, during step 270, server 198 visits the websites of one or more airlines and hotels to match the costs provided by the billing system, as described above for step 240, and thereby selects airline A3 as the air travel vendor and hotel H1 as the lodging vendor.

In step 280, reservation data is sent to the vendor to reserve a resource to support the conference. In some embodiments, step 280 is omitted.

For example, in an illustrated embodiment, step 280 includes sending data to the conference room vendor XYZ Company to reserve the conference room in Chicago for the time of the conference and to a telecommunications company AB&C to reserve the teleconferencing service for that location and time. In another embodiment, step 280 includes sending data to the vendor FOOD Company to provide sandwiches for the conference in a conference room of the organizer's organization and sending data to the vendor MAIDS Company to schedule housecleaning for that conference room at a time corresponding to the end of the conference.

In some embodiments step 280 overlaps in time with step 240, and the reservation data is sent at the same time that cost data is received. For example, some reservations systems only honor a quoted price for a few minutes or a few hours unless a reservation is made within that time. In some such embodiments, the server 198 makes a reservation to lock in a price quote for a product or service for an extended period or simply to reserve the time slot, e.g., for the conference facility in Chicago. Often the reservation is dropped if payment is not received by the end of the extended period. In some embodiments, step 280 is performed only after all invitees have accepted the invitation, as illustrated in FIG. 2; but, in some embodiments, step 280 overlaps step 252 in time and reservations are made individually as each invitee accepts the invitation.

In some embodiments, step 280 includes configuring a network to support remote conferencing. For example, to support a telephone videoconference over a telephone system circuit-switching network, telephone equipment is configured to support the videoconference. General purpose electronic conferencing (GPEC) systems allow an organizer to reserve teleconference equipment, e.g. PROSHARE™ manufactured by Intel Corp of Santa Clara Calif. and AT&T's WORLD WORX$^{SM}$ Service support reserving International Telecommunication Union—Telecommunication Standardization Sector (ITU-T) H.320, Narrow Band Visual Telephone System and Terminal Equipment. To support a packet-switching network remote conference, network equipment is configured. In an embodiment that sets up the remote conferencing automatically, server 198 includes a client process for a server (not shown) that manages the configuration of packet-switching network devices. For example, the server 198 may use a client for Cisco Works for management of network resources, or a client for Cisco Application Oriented Networking System (AONS) for configuration of network resources, or both Any method known at the time system 105 is implemented may be used, such as described in Bieselin II.

In step 290, purchase data is sent to authorize payment to a vendor. Any method known in the art at the time system 105 is implemented may be used. In some embodiments, step 290 is performed only after all invitees have accepted the invitation, as depicted in FIG. 2; but, in some embodiments, step 290 overlaps step 252 in time and payments are made individually as each invitee accepts the invitation. In some embodiments, step 290 is omitted.

For example, in some embodiments, credit card information is sent to airline A3 and hotel H1 to authorize payment of the reserved air fare and lodging. In some embodiments, step 290 includes sending a purchase order request. For example, in some embodiments, server 198 includes a purchase order client process for a purchase order system embedded in billing system 115. In some embodiments, server 198 includes a spend management system client, such as a client for the enterprise spend management system of ARIBA of Sunnyvale, Calif. Based on the vendor determined in step 270, the purchase order client forms a purchase order request message and sends that message to a purchase order server embedded in billing system server 116. In response, billing system server 116 issues a purchase order to the vendor, authorizing the vendor to provide the service and bill the conference organizer's organization upon delivery of the product or service.

Including many of the steps described in method 200, the costs of products and services that support a scheduled conference are estimated, and those products and services can be reserved and paid without additional manual input. In various embodiments, some of these resources are automatically reserved and paid when the conference is scheduled; whereas other resources are reserved or paid individually as the invited participants accept an invitation to the conference. In any case, the human administrative effort to reserve and pay for resources and resolve resource conflicts is significantly reduced by addressing resource procurement during the conference management process.

4. Hardware Overview

Figure 3:
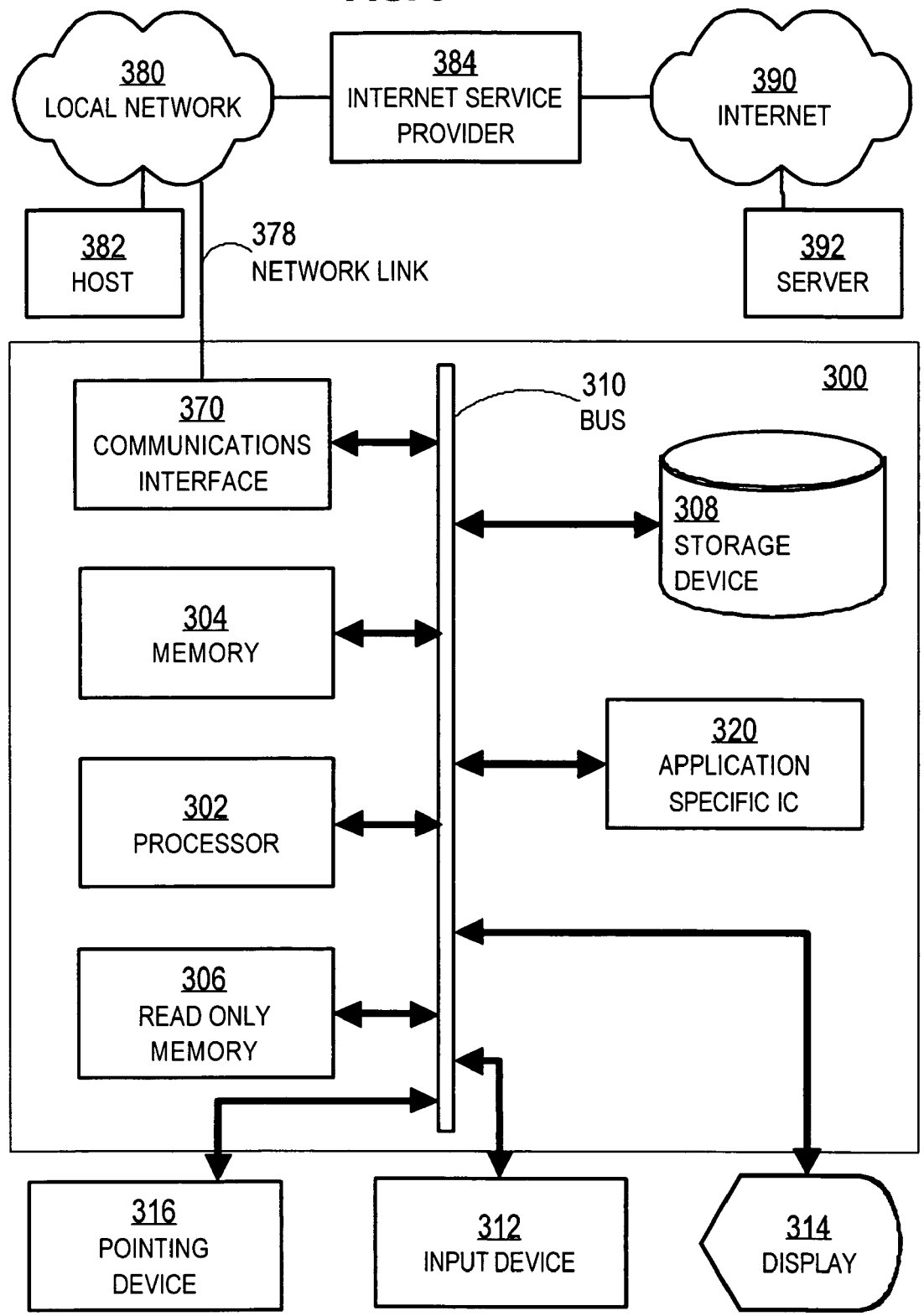
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a communication mechanism such as a bus 310 for passing information between other internal and external components of the computer system 300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non zero electric voltage, represent two states (0, 1) of a binary digit (bit). A sequence of binary digits constitutes digital data that is used to represent a number or code for a character. A bus 310 includes many parallel conductors of information so that information is transferred quickly among devices coupled to the bus 310. One or more processors 302 for processing information are coupled with the bus 310. A processor 302 performs a set of operations on information. The set of operations include bringing information in from the bus 310 and placing information on the bus 310. The set of operations also typically include comparing two or more units of information, shifting positions of units of information, and combining two or more units of information, such as by addition or multiplication. A sequence of operations to be executed by the processor 302 constitute computer instructions.

Computer system 300 also includes a memory 304 coupled to bus 310. The memory 304, such as a random access memory (RAM) or other dynamic storage device, stores information including computer instructions. Dynamic memory allows information stored therein to be changed by the computer system 300. RAM allows a unit of information stored at a location called a memory address to be stored and retrieved independently of information at neighboring addresses. The memory 304 is also used by the processor 302 to store temporary values during execution of computer instructions. The computer system 300 also includes a read only memory (ROM) 306 or other static storage device coupled to the bus 310 for storing static information, including instructions, that is not changed by the computer system 300. Also coupled to bus 310 is a non-volatile (persistent) storage device 308, such as a magnetic disk or optical disk, for storing information, including instructions, that persists even when the computer system 300 is turned off or otherwise loses power.

Information, including instructions, is provided to the bus 310 for use by the processor from an external input device 312, such as a keyboard containing alphanumeric keys operated by a human user, or a sensor. A sensor detects conditions in its vicinity and transforms those detections into signals compatible with the signals used to represent information in computer system 300. Other external devices coupled to bus 310, used primarily for interacting with humans, include a display device 314, such as a cathode ray tube (CRT) or a liquid crystal display (LCD), for presenting images, and a pointing device 316, such as a mouse or a trackball or cursor direction keys, for controlling a position of a small cursor image presented on the display 314 and issuing commands associated with graphical elements presented on the display 314.

In the illustrated embodiment, special purpose hardware, such as an application specific integrated circuit (IC) 320, is coupled to bus 310. The special purpose hardware is configured to perform operations not performed by processor 302 quickly enough for special purposes. Examples of application specific ICs include graphics accelerator cards for generating images for display 314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 300 also includes one or more instances of a communications interface 370 coupled to bus 310. Communication interface 370 provides a two-way communication coupling to a variety of external devices that operate with their own processors, such as printers, scanners and external disks. In general the coupling is with a network link 378 that is connected to a local network 380 to which a variety of external devices with their own processors are connected. For example, communication interface 370 may be a parallel port or a serial port or a universal serial bus (USB) port on a personal computer. In some embodiments, communications interface 370 is an integrated services digital network (ISDN) card or a digital subscriber line (DSL) card or a telephone modem that provides an information communication connection to a corresponding type of telephone line. In some embodiments, a communication interface 370 is a cable modem that converts signals on bus 310 into signals for a communication connection over a coaxial cable or into optical signals for a communication connection over a fiber optic cable. As another example, communications interface 370 may be a local area network (LAN) card to provide a data communication connection to a compatible LAN, such as Ethernet. Wireless links may also be implemented. For wireless links, the communications interface 370 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 302 for execution. Such a medium may take many forms, including, but not limited to, non-volatile media, volatile media and transmission media. Non-volatile media include, for example, optical or magnetic disks, such as storage device 308. Volatile media include, for example, dynamic memory 304. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Network link 378 typically provides information communication through one or more networks to other devices that use or process the information. For example, network link 378 may provide a connection through local network 380 to a host computer 382 or to equipment 384 operated by an Internet Service Provider (ISP). ISP equipment 384 in turn provides data communication services through the public, world-wide packet-switching communication network of networks now commonly referred to as the Internet 390. A computer called a server 392 connected to the Internet provides a service in response to information received over the Internet. For example, server 392 provides information representing video data for presentation at display 314.

The invention is related to the use of computer system 300 for implementing the techniques described herein. According to one embodiment of the invention, those techniques are performed by computer system 300 in response to processor 302 executing one or more sequences of one or more instructions contained in memory 304. Such instructions, also called software and program code, may be read into memory 304 from another computer-readable medium such as storage device 308. Execution of the sequences of instructions contained in memory 304 causes processor 302 to perform the method steps described herein. In alternative embodiments, hardware, such as application specific integrated circuit 320, may be used in place of or in combination with software to implement the invention. Thus, embodiments of the invention are not limited to any specific combination of hardware and software.

The signals transmitted over network link 378 and other networks through communications interface 370, which carry information to and from computer system 300, are exemplary forms of carrier waves. Computer system 300 can send and receive information, including program code, through the networks 380, 390 among others, through network link 378 and communications interface 370. In an example using the Internet 390, a server 392 transmits program code for a particular application, requested by a message sent from computer 300, through Internet 390, ISP equipment 384, local network 380 and communications interface 370. The received code may be executed by processor 302 as it is received, or may be stored in storage device 308 or other non-volatile storage for later execution, or both. In this manner, computer system 300 may obtain application program code in the form of a carrier wave.

Various forms of computer readable media may be involved in carrying one or more sequence of instructions or data or both to processor 302 for execution. For example, instructions and data may initially be carried on a magnetic disk of a remote computer such as host 382. The remote computer loads the instructions and data into its dynamic memory and sends the instructions and data over a telephone line using a modem. A modem local to the computer system 300 receives the instructions and data on a telephone line and uses an infra-red transmitter to convert the instructions and data to an infra-red signal, a carrier wave serving as the network link 378. An infrared detector serving as communications interface 370 receives the instructions and data carried in the infrared signal and places information representing the instructions and data onto bus 310. Bus 310 carries the information to memory 304 from which processor 302 retrieves and executes the instructions using some of the data sent with the instructions. The instructions and data received in memory 304 may optionally be stored on storage device 308, either before or after execution by the processor 302.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for scheduling a conference among multiple persons, comprising:
    receiving quorum data that indicates a quorum for a particular conference;
    receiving from a database availability data that indicates availability of a plurality of persons who satisfy the quorum;
    receiving from a database financial cost data that indicates a financial cost to be incurred while conducting a conference; and
    determining, using a conference scheduling system, a proposed financial cost for the particular conference that satisfies the quorum based on the quorum data, the availability data and the financial cost data.

2. The method as recited in claim 1, further comprising determining at least one of a time for the particular conference and at least one location for the particular conference based at least in part on the availability data.

3. The method as recited in claim 2, further comprising determining at least one of the time for the particular conference and at least one location for the particular conference based at least in part on the financial cost data.

4. The method as recited in claim 2, further comprising determining, using the conference scheduling system, based at least in part on the financial cost data, a vendor to provide for the particular conference at least one of a service and a product.

5. The method as recited in claim 4, further comprising reserving from the vendor for the particular conference, based on the financial cost data, at least one of the service and the product.

6. The method as recited in claim 4, further comprising authorizing payment to the vendor, based on the financial cost data, for at least one of the service and the product.

7. The method as recited in claim 4, wherein said financial cost data includes data that indicates a vendor for at least one of a product and a service to support a conference.

8. The method as recited in claim 1 wherein said financial cost data includes data that indicates a financial cost for at least one of:
    transportation for a person of the plurality of persons who satisfy the quorum to a location where the particular conference is conducted;
    food for a person of the plurality of persons who satisfy the quorum at a location where the particular conference is conducted;
    lodging for a person of the plurality of persons who satisfy the quorum in a vicinity of a location where the particular conference is conducted;
    a conference room at a location where the particular conference is conducted;
    equipment in a conference room at a location where the particular conference is conducted;
    remote conferencing service for the plurality of persons who satisfy the quorum;
    pre-conference preparation for a conference room at a locations where the particular conference is conducted;
    post-conference housecleaning for a conference room at a location where the particular conference is conducted; and
    network resources among a plurality of locations where the particular conference is conducted.

9. A method for scheduling a conference among multiple persons, comprising:
    receiving quorum data that indicates a quorum for a particular conference;
    receiving from a database availability data that indicates availability of a plurality of persons who satisfy the quorum;
    receiving from a database financial cost data that indicates a financial cost to be incurred while conducting a conference, wherein said financial cost data includes data that indicates a financial cost for at least one of
    transportation for a person of the plurality of persons who satisfy the quorum to a location where the particular conference is conducted,
    food for a person of the plurality of persons who satisfy the quorum at a location where the particular conference is conducted,
    lodging for a person of the plurality of persons who satisfy the quorum in a vicinity of a location where the particular conference is conducted,
    a conference room at a location where the particular conference is conducted,
    equipment in a conference room at a location where the particular conference is conducted,
    remote conferencing service for the plurality of persons who satisfy the quorum;
    pre-conference preparation for a conference room at a locations where the particular conference is conducted,
    post-conference housecleaning for a conference room at a location where the particular conference is conducted, and
    network resources among a plurality of locations where the particular conference is conducted;
    determining a proposed financial cost for the particular conference that satisfies the quorum based on the quorum data, the availability data and the financial cost data;
    determining at least one of a time for the particular conference and at least one location for the particular conference based on at least one of the availability data and the financial cost data;
    determining, based at least in part on the financial cost data, a vendor to provide for the particular conference at least one of a service and a product;
    reserving from the vendor for the particular conference, based on the financial cost data, at least one of the service and the product; and
    authorizing payment to the vendor, based on the financial cost data, for at least one of the service and the product.

10. A non-transitory computer-readable medium carrying one or more sequences of instructions for scheduling a conference among multiple persons, wherein execution of the one or more sequences of instructions by one or more processors causes the one or more processors to perform:

receiving quorum data that indicates a quorum for a particular conference;

receiving from a database availability data that indicates availability of a plurality of persons who satisfy the quorum;

receiving from a database financial cost data that indicates a financial cost to be incurred while conducting a conference; and determining a proposed financial cost for the particular conference that satisfies the quorum based on the quorum data, the availability data and the financial cost data.

11. The computer-readable medium as recited in claim 10, wherein execution of the one or more sequences of instructions by one or more processors further causes the one or more processors to perform the determining at least one of a time for the particular conference and at least one location for the particular conference based at least in part on the availability data.

12. The computer-readable medium as recited in claim 11, wherein execution of the one or more sequences of instructions by one or more processors further causes the one or more processors to perform the determining at least one of the time for the particular conference and at least one location for the particular conference based at least in part on the financial cost data.

13. The computer-readable medium as recited in claim 11, wherein execution of the one or more sequences of instructions by one or more processors further causes the one or more processors to perform the determining, based at least in part on the financial cost data, a vendor to provide for the particular conference at least one of a service and a product.

14. The computer-readable medium as recited in claim 13, wherein execution of the one or more sequences of instructions by one or more processors further causes the one or more processors to perform the reserving from the vendor for the particular conference, based on the financial cost data, at least one of the service and the product.

15. The computer-readable medium as recited in claim 13, wherein execution of the one or more sequences of instructions by one or more processors further causes the one or more processors to perform the authorizing payment to the vendor, based on the financial cost data, for at least one of the service and the product.

16. The computer-readable medium as recited in claim 13, wherein said financial cost data includes data that indicates a vendor for at least one of a product and a service to support a conference.

17. The computer-readable medium as recited in claim 10 wherein said financial cost data includes data that indicates a financial cost for at least one of:

transportation for a person of the plurality of persons who satisfy the quorum to a location where the particular conference is conducted;

food for a person of the plurality of persons who satisfy the quorum at a location where the particular conference is conducted;

lodging for a person of the plurality of persons who satisfy the quorum in a vicinity of a location where the particular conference is conducted;

a conference room at a location where the particular conference is conducted;

equipment in a conference room at a location where the particular conference is conducted;

remote conferencing service for the plurality of persons who satisfy the quorum;

pre-conference preparation for a conference room at a locations where the particular conference is conducted;

post-conference housecleaning for a conference room at a location where the particular conference is conducted; and network resources among a plurality of locations where the particular conference is conducted.

18. A non-transitory computer-readable medium carrying one or more sequences of instructions for scheduling a conference among multiple persons, wherein execution of the one or more sequences of instructions by one or more processors causes the one or more processors to perform:

receiving quorum data that indicates a quorum for a particular conference;

receiving from a database availability data that indicates availability of a plurality of persons who satisfy the quorum;

receiving from a database financial cost data that indicates a financial cost to be incurred while conducting a conference, wherein said financial cost data includes data that indicates a financial cost for at least one of transportation for a person of the plurality of persons who satisfy the quorum to a location where the particular conference is conducted, food for a person of the plurality of persons who satisfy the quorum at a location where the particular conference is conducted, lodging for a person of the plurality of persons who satisfy the quorum in a vicinity of a location where the particular conference is conducted, a conference room at a location where the particular conference is conducted, equipment in a conference room at a location where the particular conference is conducted, remote conferencing service for the plurality of persons who satisfy the quorum; pre-conference preparation for a conference room at a locations where the particular conference is conducted, post-conference housecleaning for a conference room at a location where the particular conference is conducted, and network resources among a plurality of locations where the particular conference is conducted;

determining a proposed financial cost for the particular conference that satisfies the quorum based on the quorum data, the availability data and the financial cost data;

determining at least one of a time for the particular conference and at least one location for the particular conference based on at least one of the availability data and the financial cost data;

determining, based at least in part on the financial cost data, a vendor to provide for the particular conference at least one of a service and a product;

reserving from the vendor for the particular conference, based on the financial cost data, at least one of the service and the product; and authorizing payment to the vendor, based on the financial cost data, for at least one of the service and the product.

19. An apparatus for scheduling a conference among multiple persons, comprising:

means for receiving quorum data that indicates a quorum for a particular conference;

means for receiving from a database availability data that indicates availability of a plurality of persons who satisfy the quorum;

means for receiving from a database financial cost data that indicates a financial cost to be incurred while conducting a conference; and means for determining a proposed financial cost for the particular conference that satisfies the quorum based on the quorum data, the availability data and the financial cost data.

20. An apparatus for scheduling a conference among multiple persons, comprising:

a network interface that is coupled to a network for communicating one or more packet flows therewith;

one or more processors; and one or more stored sequences of instructions which, when executed by the one or more processor, cause the one or more processors to carry out:

receiving quorum data that indicates a quorum for a particular conference;

receiving from a database availability data that indicates availability of a plurality of persons who satisfy the quorum;

receiving from a database financial cost data that indicates a financial cost to be incurred while conducting a conference; and determining a proposed financial cost for the particular conference that satisfies the quorum based on the quorum data, the availability data and the financial cost data.

* * * * *